March 8, 1938. C. H. WILLIS 2,110,688
ELECTRIC VALVE CIRCUIT
Filed Sept. 22, 1937
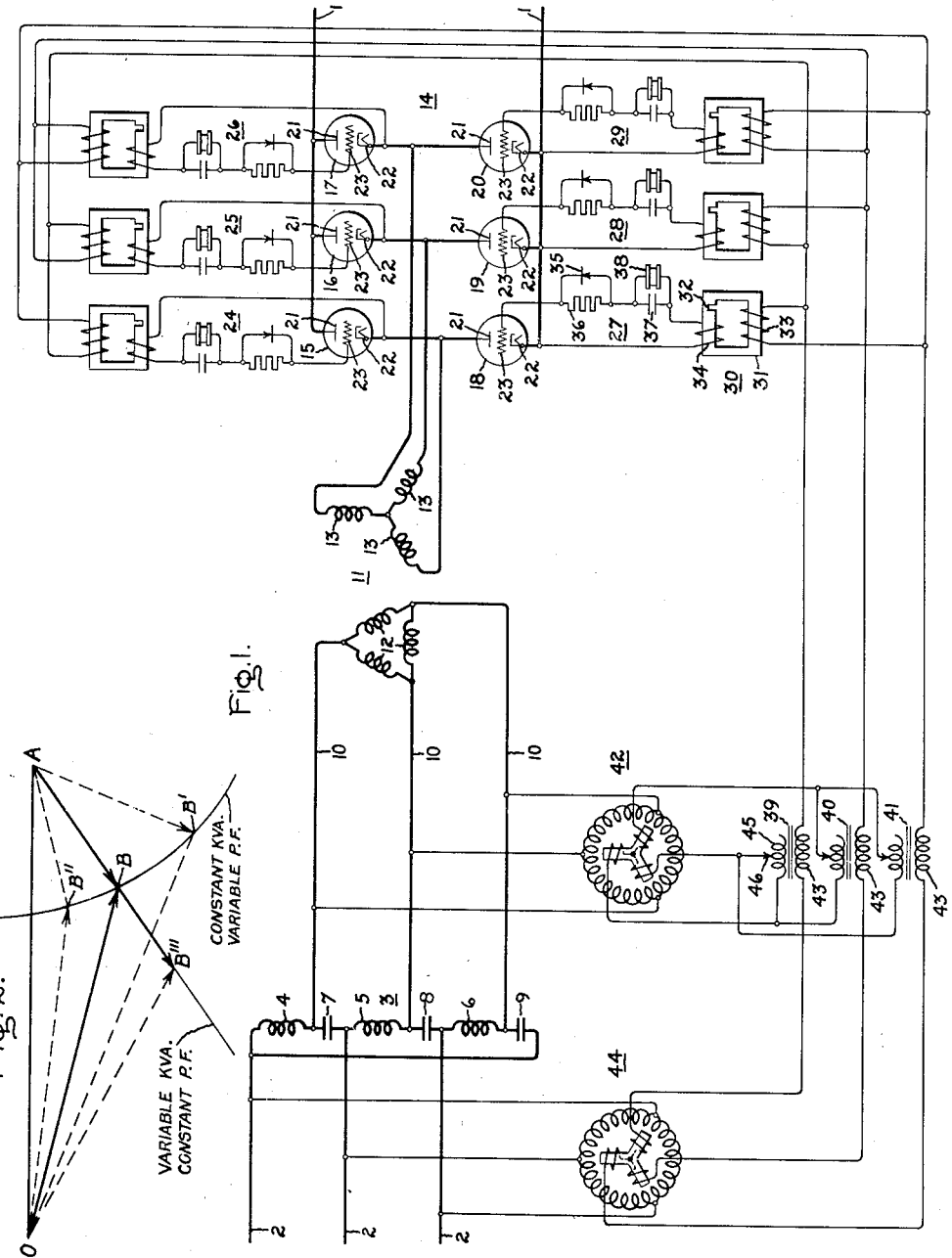
Inventor:
Clodius H. Willis,
by Harry E. Dunham
His Attorney.

Patented Mar. 8, 1938

2,110,688

UNITED STATES PATENT OFFICE 2,110,688

ELECTRIC VALVE CIRCUIT

Clodius H. Willis, Princeton, N. J., assignor to General Electric Company, a corporation of New York Application September 22, 1937, Serial No. 165,090

13 Claims. (Cl. 175—363)

My invention relates to electric valve circuits and more particularly to control or excitation circuits for electric valves used in electric power transmission and distribution systems of the type disclosed and claimed in United States Letters Patent No. 1,990,758, granted February 12, 1935 upon an application of C. W. Stone and assigned to the assignee of the present invention.

In the control of electric valves, and particularly in the control of electric valves of the type employing ionizable medium, in inverter circuits for transforming direct current to alternating current, it is important to maintain a predetermined commutating voltage and commutating angle so that the electric valves are afforded ample opportunity to deionize. As is well understood in connection with the operation of electric valve means employing ionizable mediums, the control member in general is ineffective to render the electric valve nonconductive after the electric discharge has been initiated or established. Therefore, it is important to impress on the anode a potential which is negative with respect to the cathode for a time equal to, or greater than, the time of deionization of the electric valve in order that the control member may regain control. By commutating voltage is meant the negative anode-cathode voltage which is impressed on an electric valve when another electric valve of the system is rendered conductive. If the value of commutating voltage is sufficiently large, and if the time of application of the negative anode voltage is of sufficient duration, the control member or grid of the electric valve is afforded an opportunity to regain control to maintain the electric valve nonconductive after the anode becomes positive in potential relative to the cathode. There has been evidenced a decided need for improved excitation circuits for electric valve apparatus used in inverter circuits to produce adequate commutating voltage and angle under transient load conditions and under conditions occasioned by system disturbances and irregularities.

Furthermore, in systems of the type described in the Stone patent it has been found desirable in many instances to control the electric valve inverter to transmit energy at a constant power factor to an associated constant voltage alternating current circuit.

It is an object of my invention to provide a new and improved electric valve circuit.

It is another object of my invention to provide a new and improved control or excitation circuit for electric valve apparatus employed in constant current systems.

It is a further object of my invention to provide a new and improved excitation circuit for electric valve inverters.

It is a still further object of my invention to provide a new and improved excitation circuit for electric valve transmission systems of the type described and claimed in the above-identified patent of C. W. Stone.

In accordance with the illustrated embodiment of my invention, I provide an excitation or control circuit for electric valve apparatus employed in an electric power transmission or distribution system, of the type disclosed and claimed in the above-mentioned patent of C. W. Stone, in which energy is transmitted between a constant current-direct current circuit and a constant voltage-alternating current circuit through electric valve means and a monocyclic network including serially connected reactances of opposite sign, such as inductances and capacitances. The improved excitation circuit which I provide controls the phase of the resultant alternating voltage impressed on control members of the electric valve means to maintain the power factor of the constant current alternating current circuit within a predetermined range of values and hence controls the power factor at which power is transmitted to or received from associated constant voltage alternating current circuits. Furthermore, the excitation circuit which I provide controls the commutating voltage of the electric valve means to insure positive and reliable operation. The excitation circuit comprises an arrangement for impressing on the control members of the electric valve means alternating voltages which are the resultants of components of voltage of fixed phase position and components of voltage which are derived from the constant current alternating current circuit. I have found that the constant current voltage of the monocyclic network may be used to produce a resilient voltage which varies in phase position in a manner to maintain the commutating voltage, commutating angle and the power factor within a determined range of values.

For a better understanding of my invention, reference may be had to the following description taken in connection with the accompanying drawing and its scope will be pointed out in the appended claims. Fig. 1 of the accompanying drawing diagrammatically illustrates an embodiment of my invention as applied to an electric valve power transmission system for transmitting energy between a constant current direct current circuit and a constant voltage alternating current circuit. Fig. 2 represents certain operating characteristics of the embodiment of my invention shown in Fig. 1.

In Fig. 1 there is diagrammatically illustrated an embodiment of my invention as applied to an electric valve power transmission system for transmitting energy between a constant current direct current circuit 1 and a constant voltage alternating current circuit 2. A monocyclic network 3, including a plurality of branches of serially connected reactances of opposite sign such as inductances 4, 5, and 6 and capacitances 7, 8, and 9, transform constant voltage alternating current to alternating current of constant value, or vice versa. Circuit 10, which is connected to the monocyclic network 3, is a constant current alternating current circuit and may receive power from or transmit power to the monocyclic network. To effect the desired voltage transformation of the constant current voltage, I employ a transformer 11 having primary windings 12 and secondary windings 13. Secondary windings 13 are connected to an electric valve translating apparatus 14 which transforms the constant current alternating current to direct current of constant value, or vice versa. The electric valve translating apparatus 14 includes electric valves 15-20, inclusive, each of which includes an anode 21, a cathode 22 and a control means or member 23. Electric valves 15-20 are preferably of the type employing an ionizable medium, such as a gas or a vapor. It is to be noted that the electric valve translating apparatus 14 may operate either as a full wave rectifier or as an inverter, depending upon the direction of energy or power transfer between circuits 1 and 2. If the electric valve apparatus 14 is to operate as an inverter, it is necessary that the control members 23 of the electric valves be energized properly to render the valves conductive in a predetermined order and at predetermined recurring intervals of time.

I employ excitation circuits 24-29 which are associated with electric valves 15-20, respectively, and which render the electric valves conductive in the proper order by impressing on the associated control members 23 periodic voltages which are variable in phase. The excitation circuits 24-29 are similar in construction and arrangement and for the purpose of facilitating description thereof, excitation circuit 27 associated with electric valve 18 will be considered in detail. The excitation circuit 27 may include a transformer 30 which energizes the control member 23. The transformer 30 may be of the type designed to provide an alternating or periodic voltage of peaked wave form and may comprise a core member 31 having a restricted saturable portion 32, a primary winding 33 and a secondary winding 34. A parallel connected unidirectional conducting device 35 and a noninductive impedance 36 are connected in series relation with the control member 23 to provide a relatively low impedance path to the flow of normal control member current and to offer a relatively higher impedance to the flow of current due to the deionization of the medium within the electric valve 18. This feature is disclosed and claimed in a copending patent application of B. D. Bedford, Serial No. 88,825, filed July 3, 1936 and assigned to the assignee of the present application. A parallel connected capacitance 37 and an impedance 38 are employed to serve as a self-biasing arrangement to impress on the control member a negative unidirectional biasing potential. The impedance element 38 may be of the type having a nonlinear impedance current characteristic, such as the material disclosed and claimed in United States Letters Patent No. 1,822,742, granted September 8, 1931 upon an application of Karl B. McEachron and assigned to the assignee of the present application. It is to be noted that I may employ other suitable excitation circuits, if desired.

To control the power factor of the constant current alternating current circuit 10 and hence to control the power factor at which energy or power is transmitted to or received from the constant voltage alternating current circuit 2, I provide an arrangement for controlling the phase of the periodic voltages impressed on control members 23 of electric valves 15-20. This control, of course, also controls the commutating voltage and angle of the electric valves 15-20. I derive from the constant current circuit 10 a component of voltage which is introduced in the excitation circuits 24-29 through any suitable means, such as series transformers, 39, 40, and 41. Any suitable phase shifting device, such as a rotary phase shifter 42, may be connected between the transformers 39-41 to control the phase of the voltage derived from the constant current alternating current circuit 10. The transformers 39-41 are provided with windings 43 which are connected in series relation with the constant voltage output of a suitable phase shifting device 44 which introduces into the excitation circuits 24-29 voltages of fixed magnitude and phase position. The transformers 39-41 may also be provided with primary windings 45 having adjustable tap connections 46 to control the magnitude of the voltage introduced into the excitation circuits from circuit 10. The voltage impressed on primary windings 33 of transformers 30 in excitation circuits 24-29 are resultants of the components of voltage derived from the constant voltage circuit 2 and the constant current circuit 10.

The general principles of operation of the embodiment of my invention shown in Fig. 1 will be considered first. While it is to be understood that the system shown in Fig. 1 may be employed to transmit energy in either direction between circuits 1 and 2, my invention will be explained for the conditions prevailing when power is transmitted from the constant current direct current circuit 1 to the constant voltage alternating current circuit 2. The electric valve apparatus 14, acting in conjunction with the monocyclic network 3, transforms the constant current direct current to constant voltage alternating current. The electric valves 15-20 are conductive in a predetermined order and for predetermined intervals of time which in the particular arrangement shown is substantially 120 electrical degrees. The rotary phase shifters 42 and 44 are adjusted to supply to the excitation circuits 24-29 resultant alternating voltages having a fixed phase position which corresponds to a predetermined power factor and voltage which it is desired to maintain.

The operating characteristics of Fig. 2 may be considered to explain the phase relationships of the various voltages involved. Considering the voltage of one phase of the polyphase excitation system, as for example the voltage impressed on transformer 30 of excitation circuit 27, the component of voltage supplied by the rotary phase shifter 44 may be represented by a vector OA and the component of voltage introduced into the excitation circuit by the associated transformer 41 may be represented by vector AB. The rotary phase shifters 42 and 44 may be adjusted so that these voltages are in the relative phase positions indicated when the power factor and the commutating voltage are within a predetermined range of values. The resultant voltage impressed on primary winding 33 of transformer 30 may be represented as a vector OB. I have found that the voltage of the constant current alternating current circuit 10 varies in phase position in a manner to maintain a predetermined range of commutating voltages or a predetermined range of power factor of circuit 10. In constant current inverter systems of this nature a retardation in phase of the voltages impressed on the control members 23 relative to the voltage of the constant voltage circuit 10 effects an increase in the commutating voltage angle and hence an increase in the power factor angle. In Fig. 2 two loci have been shown, that is, the constant kva.-variable power factor locus and the variable kva.-constant power factor locus. If it be considered that the kva. remains constant and that the power factor of the circuit 10 increases, the voltage AB introduced into the excitation circuit in response to the constant current voltage of circuit 10 will swing to the position AB' effecting a retardation in the phase of the resultant grid voltage impressed on the associated control member to the position OB', tending thereby to restore the resultant control voltage to the position OB by increasing the commutating voltage and the power factor angle. On the other hand, if the power factor decreases beyond a predetermined range of values the vector AB will swing to the position AB'' tending to restore the resultant control member voltage to the position AB by effecting a decrease in the commutating angle and a decrease in commutating voltage by advancement in the phase of the resultant voltage impressed on the control member to the position OB''.

Furthermore, it is to be noted that the phase of the resultant control voltage impressed on the control members varies in accordance with the kva. transmitted by the system. Referring to the variable kva. constant power factor axis, it will be noted that if the kva. increases, the component as represented by the vector AB derived from the constant current circuit increases to a value corresponding to the vector AB'''. The phase of the resultant voltage impressed on the control members will be rotated to a position corresponding to the vector OB''', thereby increasing the commutating voltage or the amount of reactive kva. transmitted and tending to restore the resultant control member voltage to the position OB. On the other hand, if the kva. transmitted by the system decreases, the resultant voltage impressed on the control members will be advanced in phase tending to return the commutating voltage and the reactive kva. to the predetermined desired range of values. In this manner it will be understood that the phase of the resultant voltage impressed on the control members of the electric valves varies in accordance with the kva. as well as the power factor and commutating voltage.

An important feature of my invention is the manner in which the circuit maintains a predetermined range of reactive volt-amperes in the constant current alternating current circuit 10, and hence controls the power factor at which energy or power is received from or transmitted to the constant voltage alternating current circuit 2.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a constant current alternating current circuit, a constant voltage alternating current circuit connected to exchange power with said constant current circuit, a constant current direct current circuit, electric valve means interconnecting said constant current circuits, and means connected to control the conductivity of said electric valve means and operative in accordance with an electrical condition of said constant current alternating current circuit for controlling the power factor of said constant current alternating current circuit.

2. In combination, a constant current alternating current circuit, a constant voltage alternating current circuit connected to exchange power with said constant current circuit, a constant current direct current circuit, electric valve means interconnecting said constant current circuits, and means connected to control the conductivity of said electric valve means and being responsive to a resultant of an electrical condition of said constant voltage circuit and an electrical condition of said constant current alternating current circuit.

3. In combination, a constant current alternating current circuit, a constant voltage alternating current circuit connected to exchange power with said constant current circuit, a constant current direct current circuit, electric valve means interconnecting said constant current circuits, said electric valve means being provided with control means for controlling the conductivity thereof, and a circuit for energizing said control means for impressing thereon a resultant voltage having a component which varies as the voltage of said constant voltage alternating current circuit and a component which varies as the voltage of said constant current alternating current circuit.

4. In combination, a constant voltage alternating current circuit, a constant current direct current circuit, a monocyclic network connected to said constant voltage circuit for transforming constant voltage alternating current to alternating current of constant value, a constant current alternating current circuit connected to said monocyclic network, an electric valve means connected between said direct current circuit and said constant current alternating current circuit, and means for controlling the power factor of said constant current alternating current circuit in accordance with an electrical condition of the constant current alternating current circuit.

5. In an electric power system for transmitting energy from a constant current direct current circuit to a constant voltage alternating current circuit, the combination of a monocyclic network connected to said constant voltage circuit for transforming constant voltage alternating current to alternating current of constant value, a constant current alternating current circuit, an electric valve means connected between said direct current circuit and said constant current alternating current circuit, said electric valve means having control means for controlling the conductivity thereof, and means responsive to the voltage of the constant current alternating current circuit for energizing said control means to control the power factor at which power is transmitted to or received from said constant voltage alternating current circuit.

6. In combination, a constant voltage alternating current circuit, a constant current direct current circuit, a monocyclic network connected to said constant voltage circuit and including reactances of opposite sign for transforming constant voltage alternating current to alternating current of constant value, a constant current alternating current circuit connected to said monocyclic network, electric valve means connected between said direct current circuit and said constant current alternating current circuit, said electric valve means having control means for controlling the conductivity thereof, and means energized in accordance with an electrical condition of the constant current alternating current circuit for energizing said control means to control the amount of reactive volt-amperes transmitted to said constant voltage circuit.

7. In combination, a constant voltage alternating current circuit, a constant current direct current circuit, a monocyclic network connected to said constant voltage circuit and including reactances of opposite sign for transforming constant voltage alternating current to alternating current of constant value, a constant current alternating current circuit connected to said monocyclic network, electric valve means connected between said direct current circuit and said constant current alternating current circuit, said electric valve means having control means for controlling the conductivity thereof, and an excitation circuit for energizing said control means comprising means energized in accordance with the voltage of said constant current alternating current circuit for controlling the power factor thereof.

8. In combination, a constant voltage alternating current circuit, a constant current direct current circuit, a monocyclic network connected to said constant voltage circuit and including reactances of opposite sign, a constant current alternating current circuit connected to said monocyclic network, electric valve means connected between said direct current circuit and said constant current alternating current circuit, said electric valve means having control means for controlling the conductivity thereof, an excitation circuit for energizing said control means, and means for introducing in said excitation circuit a component of voltage derived from said constant current alternating current circuit to control the commutating voltage of said electric valve means.

9. In combination, a constant voltage alternating current circuit, a constant current direct current circuit, a monocyclic network connected to said constant voltage alternating current circuit and including reactances of opposite sign, a constant current alternating current circuit connected to said monocyclic network, electric valve means connected between said constant current direct current circuit and said constant current alternating current circuit, said electric valve means having control means for controlling the conductivity thereof, and an excitation circuit for energizing said control means comprising means for producing a component of voltage of fixed phase position and means for introducing in said excitation circuit a component of voltage derived from said constant current alternating current circuit for controlling the phase of the resultant voltage impressed on said control means.

10. In combination, a constant voltage alternating current circuit, a constant current direct current circuit, a monocyclic network connected to said constant voltage alternating current circuit and including reactances of opposite sign, a constant current alternating current circuit connected to said monocyclic network, electric valve means connected between said constant current direct current circuit and said constant current alternating current circuit, said electric valve means having control means for controlling the conductivity thereof, and an excitation circuit for impressing on said control member a voltage variable in phase which is a resultant of a component of voltage derived from said constant voltage alternating current circuit and a component of voltage derived from said constant current alternating current circuit.

11. In combination, a constant voltage alternating current circuit, a constant current direct current circuit, a monocyclic network connected to said constant voltage alternating current circuit and including reactances of opposite sign, a constant current alternating current circuit connected to said monocyclic network, electric valve means connected between said constant current direct current circuit and said constant current alternating current circuit, said electric valve means having control means for controlling the conductivity thereof, and an excitation circuit comprising means for producing a component of alternating voltage of fixed phase position, means for producing a component of alternating voltage which varies in accordance with the voltage of said constant current alternating current circuit and having a component in phase opposition to the component of fixed phase position and means responsive to a resultant of said components for impressing on said control means an alternating voltage variable in phase to maintain the power factor of said constant current alternating current circuit within a predetermined range of values.

12. In combination, a constant voltage alternating current circuit, a constant current direct current circuit, a monocyclic network connected to said constant voltage circuit for transforming constant voltage alternating current to alternating current of constant value, a constant current alternating current circuit connected to said monocyclic network, an electric valve means connected between said direct current circuit and said constant current alternating current circuit, and means for controlling the commutating voltage of said electric valve means in accordance with the volt-amperes and the power factor of said constant current alternating current circuit.

13. In combination, a constant voltage alternating current circuit, a constant current direct current circuit, a monocyclic network connected to said constant voltage circuit for transforming constant voltage alternating current to alternating current of constant value, a constant current alternating current circuit connected to said monocyclic network, an electric valve means connected between said direct current circuit and said constant current alternating current circuit, said electric valve means having control means for controlling the conductivity thereof, and an excitation circuit for energizing said control means comprising means for impressing on said control means an alternating voltage the phase of which varies conjointly in accordance with the volt-amperes and the power factor of said constant current alternating current circuit.

CLODIUS H. WILLIS.